(No Model.)

H. Q. PLUMMER.
AUTOMATIC GUIDING ATTACHMENT FOR BICYCLES.

No. 591,930. Patented Oct. 19, 1897.

Witnesses
Chas. Marien.
D. D. Deane.

Inventor
HORACE Q. PLUMMER.
By Thurman & Silvius.
Attorneys.

THE NORRIS PETERS CO., PHOTO-LITHO., WASHINGTON, D. C.

UNITED STATES PATENT OFFICE.

HORACE Q. PLUMMER, OF MAPLEWOOD, INDIANA.

AUTOMATIC GUIDING ATTACHMENT FOR BICYCLES.

SPECIFICATION forming part of Letters Patent No. 591,930, dated October 19, 1897.

Application filed October 30, 1896. Serial No. 610,553. (No model.)

*To all whom it may concern:*

Be it known that I, HORACE Q. PLUMMER, a citizen of the United States, residing at Maplewood, in the county of Hendricks and State of Indiana, have invented certain new and useful Improvements in Automatic Guiding Attachments for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a device designed to be applied to the frame of a bicycle and to operate in connection with the front forks of the vehicle for the purpose of automatically guiding the bicycle in a straight line and consisting in the different parts and combination of parts hereinafter described, and pointed out in the claims.

The object of my invention is to provide a guide which may be attached to any bicycle, which will automatically guide the bicycle in a straight line, while at the same time permit deviations therefrom to either the right or left side, as it may be desired, by use of the usual controlling handle-bars.

A further object is to provide in combination therewith brackets upon which the feet may rest when descending a hill, usually termed "coasters," and which are adapted to be used in guiding the vehicle to a limited extent, without the use of the handle-bars.

Figure 1:
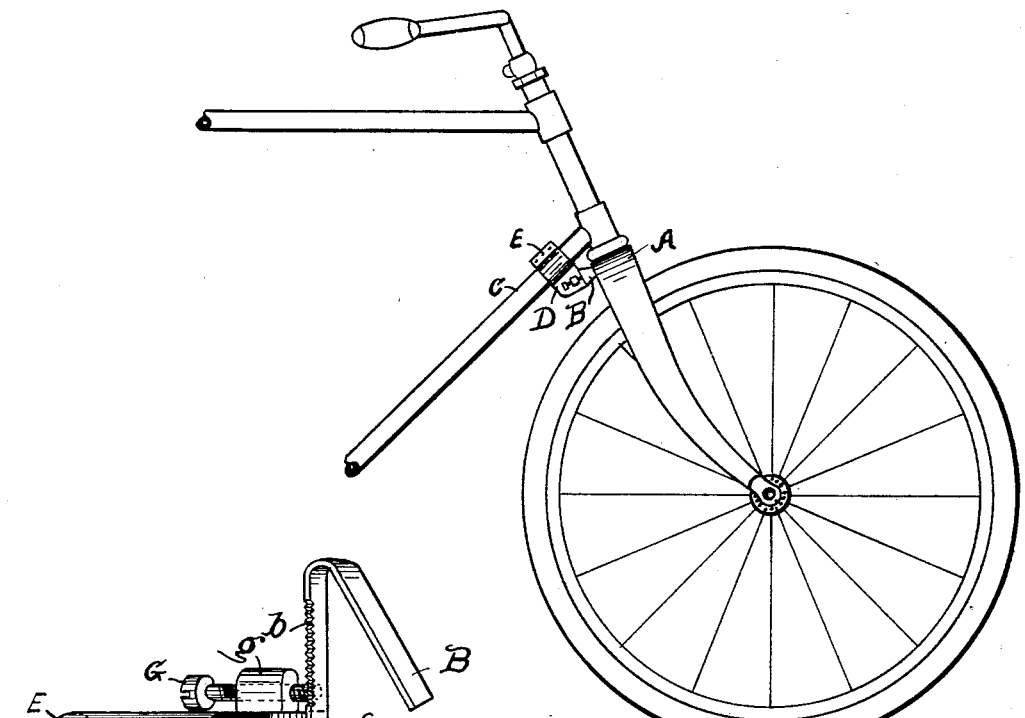
Figure 2:
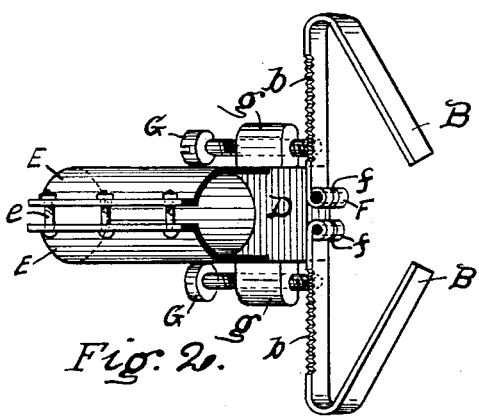
Figure 3:
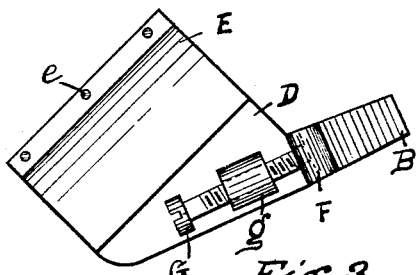
Figure 4:
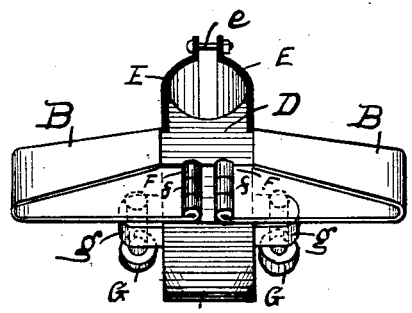

Referring to the drawings, Figure 1 represents a side elevation of the forward part of a bicycle on which my device is applied; Fig. 2, a top plan view of my device detached; Fig. 3, a side elevation, and Fig. 4 a front elevation, of my device.

In the drawings, A A designate the front forks of a bicycle, and C the lower part of the frame thereof; D, the head-block, and B the spring-guides, and E the retaining-clamp.

In constructing my invention the various parts are composed of suitable metal, each part of that which is most adaptable therefor, the guides being made, preferably, of spring-steel, and a slight variation may be made in the dimensions to adapt the whole to the various patterns of bicycle-frames.

Attached to the head-block D is an open clamp E E, which is preferably integral with the head-block, but may be suitably made separately and attached thereto. It is capable of being sprung open and to close over the tubing forming the lower bar C of the bicycle-frame and is secured thereto by means of screw-bolts e. At each side of the head-block is a lug g, having a hole or opening therethrough having screw-threads, and inserted therein is a screw G, the end of which emerges from the forward end of the lug. These screw-bolts are adapted to be adjustable to control the tension of the guides. At the front of the head-blocks are ears f, having pintle-holes therethrough forming a part of the hinge to which the guides are connected.

The guides B B are made right and left and comprise each a steel spring of approximately V form and one end of each is slitted and turned over, forming a pair of eyes F or part of the hinge adapted to be pivotally attached to the ears on the head-block, and are so attached. At the top edge of the straight portion near the hinge are a series of teeth b to prevent the slipping of a foot resting thereon. The rear side of this straight portion is pressed against the ends of the screws G by the opposite ends of the guides coming in contact with the back of the wheel-forks A a short distance below the crown of the forks. In some cases instead of providing the hinges F f the rear part of the guide is composed of a single piece of metal extending entirely across and is suitably secured to the head-block rigidly; but I prefer the construction shown in which each side is independent of the other.

In practical operation the clamp being secured to the frame so that the head-block is below the same and just back of the crown of the forks the outer ends of the spring-guides are pressed against the rear of the forks before the head-block is secured to the frame. When securely clamped to the frame, the guides should press with equal force against each arm of the fork; but should the strength of one side overbalance the other the inequality is adjusted by means of the screws G, so that the fork is turned or squared until the forward wheel of the bicycle will run in a straight line and the wheel may be ridden without use of the handle-bars and it is obvious that if it is desired to deviate slightly to either side this may be accomplished by pressing the feet against the notched parts $b$ as desired. The pressure on the right side will increase the tension on that side and turn the wheel toward the left and vice versa. The elasticity of the spring-guides will permit of the vehicle being turned around or guided in any direction by the use of the handle-bars in the usual way.

It is obvious that minor changes and modifications may be substituted in my invention without deviating from the spirit and intent thereof.

Having thus described my invention, what I claim as new, and desire to secure by Letters Patent, is—

1. An automatic guiding attachment for bicycles consisting of a head-block adapted to be attached to the lower part of a bicycle-frame; spring-guides attached adjustably thereto and adapted to press against the rear part of the arms of a front fork of a bicycle; adjusting-screws on said head adapted to control the tension of said spring-guides independently and means for attaching said head-block to said bicycle-frame substantially as and for the purpose shown and described.

2. In a guiding attachment for bicycles the combination with the frame and fork thereof; of a head-block having a lug at each side thereof provided with a threaded hole extending horizontally therethrough; the clamp rigidly secured to said head and adapted to secure the same to said frame; spring-guides secured to said head-block and adapted to press against the rear of the said fork and adjusting-screws in said lugs pressing against the back of said spring-guides substantially as shown and described.

In testimony whereof I affix my signature in presence of two witnesses.

H. Q. PLUMMER.

Witnesses:
JNO. S. THURMAN,
E. T. SILVINS.